(No Model.)
J. R. HUXTABLE.
TRACTION WHEEL.
No. 371,142. Patented Oct. 4, 1887.
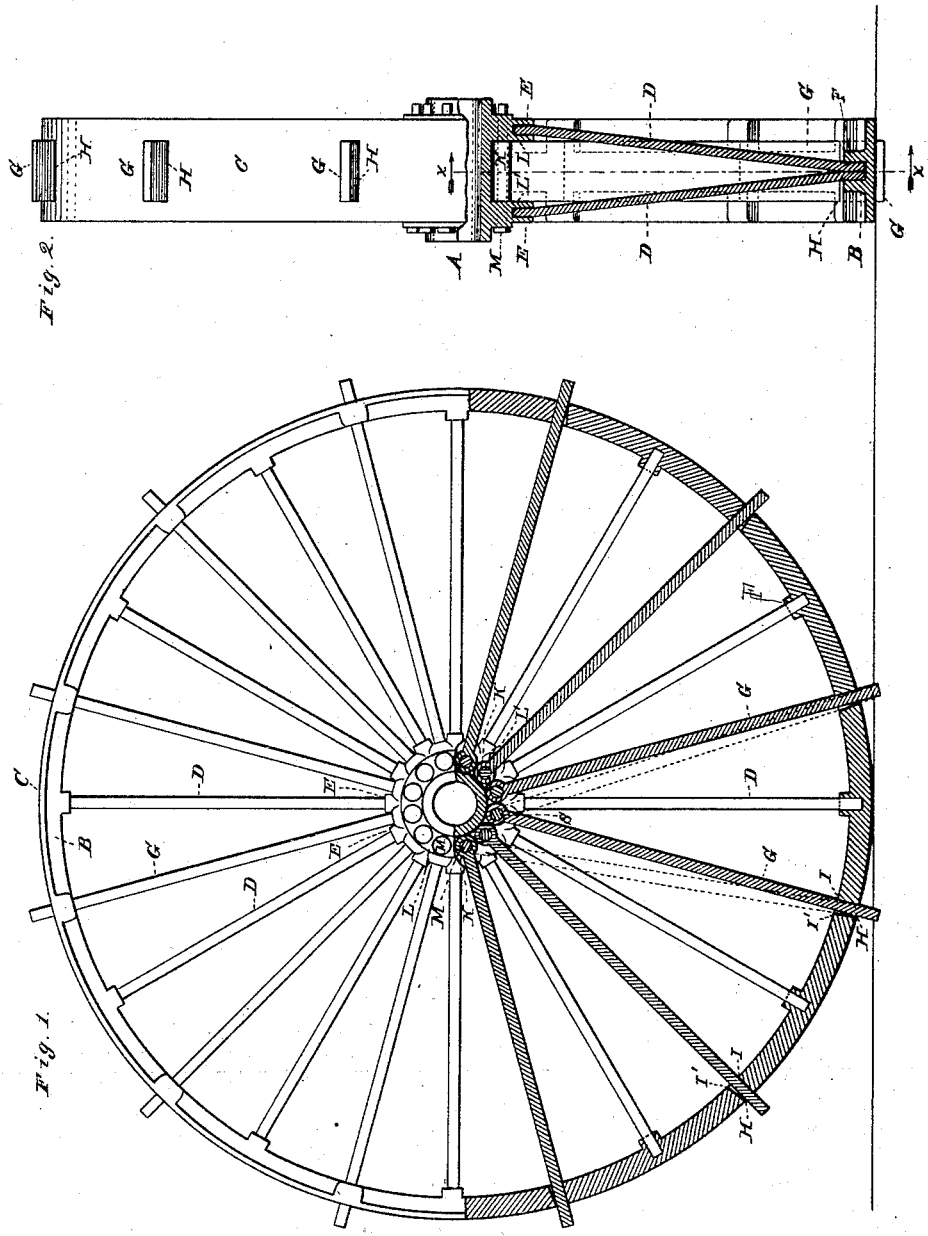
WITNESSES
Villette Anderson.
Philip Mari
INVENTOR
J. R. Huxtable
by Anderson & Smith
ATTORNEYS

UNITED STATES PATENT OFFICE.

JAMES R. HUXTABLE, OF HASTINGS, NEBRASKA.

TRACTION-WHEEL.

SPECIFICATION forming part of Letters Patent No. 371,142, dated October 4, 1887.

Application filed September 15, 1886. Renewed August 11, 1887. Serial No. 246,744. (No model.)

*To all whom it may concern:*

Be it known that I, JAMES R. HUXTABLE, a citizen of the United States, residing at Hastings, in the county of Adams and State of Nebraska, have invented certain new and useful Improvements in Traction-Wheels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, the upper portion being a side view, and the lower portion broken away and shown in section. Fig. 2 is a view showing a front view of the upper portion, the lower portion being a cross-section through the wheel.

My invention relates to traction-wheels for road-engines, the object of the invention being to prevent the traction-wheel from slipping on wet or muddy ground; and it consists in the construction and novel combination of parts, as hereinafter described, and pointed out in the claims.

Referring by letter to the accompanying drawings, A designates the hub of the wheel. B is the rim of the wheel, which has an integral tire, C, cast therewith, and D D, &c., are the ordinary spokes, which are secured at their inner ends in seats E E in the periphery of the hub A, from which points or seats the pairs of spokes D D converge and meet at their outer ends, said outer ends being confined in integral seats F on the inner periphery of the rim B of the wheel.

G G G, &c., designate the traction spokes, which spokes are flat spokes—that is, they are rectangular in cross-section—and the outer ends of these traction-spokes G, &c., project through slots H, made transversely through the rim and integral tire of the wheel. The slots H have one of their longer sides, I, made plain, while the other longer side, I', is beveled or inclined from the outer periphery of the tire inwardly and away from the plain side I, the object of the bevel sides of said slots H being to permit the adjustment of the traction-spokes therein to project or retract the projecting ends of said traction-spokes to suit the condition of the road over which the traction-engine is to pass and to prevent the traction-wheel from slipping in wet or muddy ground. The inner ends of the traction-spokes G G, &c., are provided with eyes K, which extend laterally through them, and the said inner ends of the traction-spokes are removably secured between the integral peripheral flanges L L' near the ends of the hub A by bolts M, passed through the flanges L L', and the eyes of the traction-spokes, keys, or nuts being employed to retain the bolts M in their seats. When the traction-spokes extend radially from their seats in the hub and project through the slots H in the rim and tire, the projecting ends or traction-points are the longest and will enter the ground deeper and take better hold therein than under any other adjustment that can be given to the traction-spokes, and this adjustment is to be resorted to in wet or slippery ground. In dry or ordinary ground the projecting ends of the traction-spokes are to be shortened by retracting said traction-spokes. This adjustment is accomplished by withdrawing the bolts M and moving the inner ends of the spokes and securing them between the next pair of bolt-holes, S, above the pair of bolt-holes that permitted the traction-spokes to extend radially from the hub, so that after the adjustment has been made the traction-spokes will extend tangentially from the hub. The traction-spokes may be retracted, if desired, so as not to extend at all beyond the periphery of the tire by moving their inner ends one step farther from their initial positions, which, for the sake of illustration, I will call the "radial" positions, and securing said inner ends between the second pair of bolt-holes in the flanged hub—that is to say, the pairs of bolt-holes two steps removed from the initial or radial position before mentioned.

Having described this invention, what I claim, and desire to secure by Letters Patent, is—

The combination, with the flanged hub, the radial spokes, and the rim and tire provided with the transverse slots, having one plain and one inclined longer side, of the adjustable traction-spokes detachably connected to the hub and resting in the rim and tire, substantially as specified.

In testimony whereof I affix my signature in presence of two witnesses.

JAMES R. HUXTABLE.

Witnesses:
WILLIAM M. LOWMAN,
FRED E. GARRATT.